Figure 1:
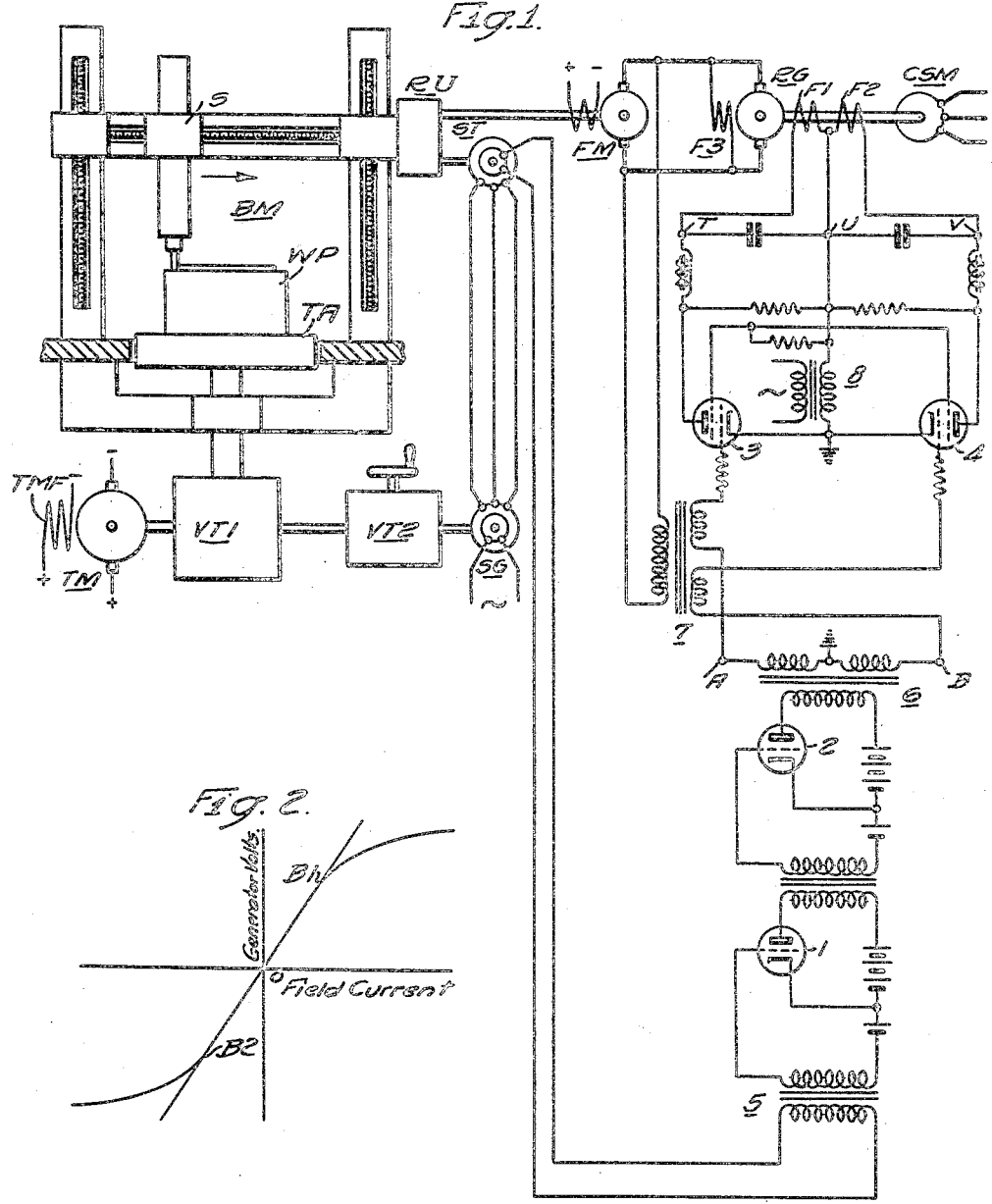

Feb. 21, 1950  L. W. HERCHENROEDER  2,498,272
MACHINE TOOL CONTROL SYSTEM
Filed Sept. 7, 1945

WITNESSES:

INVENTOR
Louis W. Herchenroeder.
BY
Paul E. Friedemann
ATTORNEY

Patented Feb. 21, 1950

2,498,272

UNITED STATES PATENT OFFICE 2,498,272

MACHINE-TOOL CONTROL SYSTEM

Louis W. Herchenroeder, Pittsburgh, Pa., assignor to Westinghouse Electric Corporation, East Pittsburgh, Pa., a corporation of Pennsylvania Application September 7, 1945, Serial No. 614,949

5 Claims. (Cl. 77—4)

This invention relates, generally, to electric drives and, more particularly, to electric drives for positioning and driving in positional agreement an element to be controlled in accordance with a reference or controlling element.

More specifically, the invention relates to an electric follow-up drive or speed-matching drive which provides a positive power drive for a pair of elements and utilizes the difference in position of the pair of elements for controlling one of the elements in accordance with the movements of the other element.

In its broad aspects, this invention is related to a copending application of George E. King, Serial No. 545,754, filed July 20, 1944, now United States Patent No. 2,389,368, issued November 20, 1945, entitled Control systems, and to a copending application of George E. King et al., Serial No. 580,040, filed February 27, 1945, now United States Patent No. 2,488,412, and entitled Control systems, both applications being assigned to the same assignee as this invention.

The invention as hereinafter described and as illustrated in the accompanying drawing is particularly adapted for machine tool control, that is, types of tools having moving workpiece elements and moving cutting tool elements in which a variable ratio of the speeds of the elements is desired, and any selected ratio of speeds is to be maintained constant.

The average boring mill comprises a rotatable table upon which the workpiece to be machined is secured, and a moving saddle or support which operates along a rail extending diametrically of the table and which carries the cutting tool ram. On relatively small boring mills, straight mechanical drives between the table and tool elements are usually satisfactory. However, as the machine size increases, the mechanical drives become increasingly cumbersome and complicated, and, hence, undesirable. Electric drives for such machines offer a sensible and simple solution to the drive problem of the machine tool elements but introduce a new problem, namely that of properly synchronizing the movement of the separate driving motors for the machine tool elements. There are a number of methods by which the separate motors may be properly operated, some of which are illustrated in the above-mentioned copending applications. The present invention relates to an equally desirable electric drive embodying another method of control.

One of the principal objects of this invention is to provide an electric drive for controlling the movements of an element in accordance with the movements of a controlling element, which is simple in arrangement and effective in operation.

Another object of this invention is to provide an electric drive of the character mentioned which controls the element to be controlled in accordance with the difference in position of the controlled and controlling elements.

Yet another object of this invention is to provide an electric drive of the character mentioned in which means is provided for changing the ratios of the operating speeds of the controlled and controlling elements and which thereafter maintains a selected ratio of speeds constant.

A further object of this invention is to provide an electric drive of the character referred to in which the time lag for follow-up of the controlled element of the movements of the controlling member is a minimum.

Figure 2:
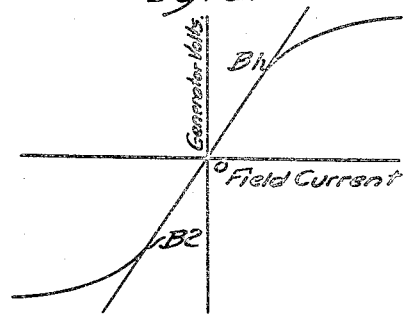

Other objects and advantages will become apparent upon a study of the following specification when considered in conjunction with the accompanying drawing, in which:

Figure 1 illustrates an electric drive embodying the principles of this invention, and Fig. 2 graphically illustrates the operating characteristics of the regulating generator of Fig. 1.

In a broad sense, the electric drive or control system illustrated in the drawing controls the ratio of the speeds of a pair of elements or, stated otherwise, provides a control of one element depending upon the movements of another element, by producing an electrical quantity having characteristics depending upon the position of the reference or controlling element, utilizing said quantity in conjunction with a means responsive to the position of the controlled element to produce a quantity representative of the difference in position of the controlled and controlling elements, and thereafter utilizing the difference quantity to control the controlled element in a manner to minimize the position difference quantity.

The foregoing basic principles together with other more detailed principles are embodied in Fig. 1 of the drawing. In this figure, a boring mill generally designated BM has its table TA driven by a suitable driving motor such as the table motor TM. This motor has its armature winding and field winding TMF energized by a suitable source of unidirectional current. If such a motor is a constant speed motor the drive for the table will usually be through a variable ratio transmission as VT1 which may be selectively set over its entire speed range for any desired ratio of input to output speed. Ordinarily such a motor will be of the adjustable voltage adjustable field type having a sufficiently large speed range to cover the desired range of speeds with no or a minimum of gear changing in the table drive. Since variable ratio transmissions are well known to the art and the details per se of such an element form no part of this invention, such transmissions are indicated generally in block outline. A workpiece WP is shown secured to the boring mill table TA and a cutting tool is shown engaging the workpiece. The cutting tool is fastened to the tool ram which operates vertically of the machine and which ram is, in turn, carried upon saddle S which threadedly engages the rotatable threaded shaft disposed diametrically of the machine. This threaded shaft is driven by the feed motor FM through a suitable gear reduction unit RU generally indicated in block outline. The feed motor thus controls the rate of movement of the saddle S and cutting tool across the boring mill table.

The motors TM and FM are mechanically independent; hence, some means must be provided for properly synchronizing the movements of the feed motor FM with those of the table motor TM to obtain the necessary constant feed of the cutting tool with respect to the revolutions of the workpiece. To this end, a synchronous connection or positioning means is provided including a synchro-tie generator SG and a synchro-tie transformer ST, respectively driven at speeds proportional to the boring mill table and saddle. Specifically the synchro-tie generator is driven by a shaft from the transmission VT1 which passes through the transmission VT2, while the synchro-tie transformer is driven from an output shaft of the gear reduction unit RU. The synchronous positioning units are conventional, the generator ordinarily having a rotor which carries a single phase primary winding energized from a source of alternating current indicated by the sinusoidal wave and having a three winding secondary assembly which is stationary. While the synchro-tie transformer is provided with a three winding primary assembly which is stationary and a single phase rotor. The secondary of the generator is electrically connected to the primary of the transformer. Movements of the synchro-tie generator rotor in rotation varies the flux linkages of the primary and secondary windings thereof in such a manner that the pattern of the electrical quantity generated in the secondary thereof characterizes the angular position of the rotor. This electrical pattern is transmitted over the interconnecting conductors to the primary windings of the synchro-tie transformer. When the winding axis of the transformer rotor is in quadrature with the primary flux pattern, zero voltage is induced therein. The instantaneous polarities of the induced voltage reverses when the winding axis of the secondary is displaced to one side or the other of the quadrature position. Thus, by properly indexing the synchro-tie stators, correspondence of the synchro-tie rotors, and, as a consequence, position correspondence of the elements to which they are mechanically tied is achieved, when the induced voltage in the transformer rotor winding is zero. By means of the instantaneous polarity reversal for shifts in quadrature relation of the transformer rotor winding with respect to the primary flux pattern, it is known whether the tool saddle S is leading or lagging the table movements.

Since the speed range of the motor FM is the largest and the motor is driving the load having the least mechanical inertia, it is selected as the motor to be regulated. Thus, the table TA or the synchro-tie generator may be termed the reference or controlling element and the feed motor and its connected members the controlled element.

To this end, the feed motor has its armature winding connected in series circuit relation with the armature winding of a regulating generator RG, the generator RG being driven by a suitable constant speed motor CSM. The motor FM is provided with a single separately excited field winding and speed regulation is dependent upon the armature voltage control afforded by the regulating generator RG and the other system elements controlling the regulating generator's excitation. Regulating generator RG has a field system including the control fields F1 and F2 and the shunt field F3, in which the control fields are energized by the output of the amplifier at terminals T, U, and V, the arrangement being such that when the control fields are equally energized the total control field flux is zero. This regulating generator has special operating characteristics as graphically illustrated in Fig. 2. This generator by reason of the function of the shunt connected field F3 is of the self energizing type. The resistance of the regulating generator's load circuit is so adjusted that the resistance line thereof, represented by the straight line in Fig. 2, is tangent to the initial straight line portion of the no-load saturation curve of the generator. Thus the generator may have a voltage output equal to the ordinate of any of the points of tangency of the curves, for example, the points B1 and B2 and the function of the two fields F1 and F2 becomes that of locating the proper operating point of the generator along the tangent curves and maintaining that operating point constant for a given control condition. When the exciting currents in the respective control fields are unequal the resulting flux causes the generator output to change. This change is reflected in a correction in speed of the feed motor such as to properly position the rotor of the synchro-tie transformer that the control quantity fed from the transformer ST through the amplifier to the control fields is reduced to zero, at which time a balance of the control fields is achieved.

The amplifier is controlled by the potential difference at terminals A and B, which terminals are connected to the secondary or rotor winding of the synchro-tie transformer ST through transformer 6, the voltage amplifier including tubes 1 and 2 and transformer 5.

This amplifier has three stages of amplification. In the first two stages, triode voltage amplifier tubes 1 and 2 are used, and in the last stage two power amplifier tubes 3 and 4, connected in push-pull relationship, are utilized. Plate current supply for the first two stages is direct current and is supplied by the batteries as indicated. The plate supply for the final stage being alternating current supplied by the transformer 8, the primary of which is preferably energized from the same source or a source having the same frequency as that energizing the generator SG.

The voltage applied across the primary winding of transformer 5 is the error voltage generated in the transformer ST which, as previously mentioned, has an instantaneous polarity depending upon the angular relation of the coil axis with respect to the primary winding flux pattern. This voltage is passed through the first two amplifier tubes 1 and 2 and applied to the primary of transformer 6, the secondary of which is center-tapped to ground and the extremities of which are each connected to a control grid of one of the tubes 3 and 4. The plate circuits of these tubes connect to the terminals T and V, while the terminal U is common to both circuits. The portion of the amplifier controlled by tubes 3 and 4 is polarity sensitive and is adjusted so that for zero potential at the primary of transformer 6 at which time points A and B are at like potentials, tubes 3 and 4 carry equal anode currents. When an alternating-current position signal which is in phase with the power supplied to the amplifier at transformer 8 is applied to the primary of transformer 6, the potentials of points A and B change oppositely, the anode currents of tubes 3 and 4 are unbalanced, for example, tube 3 may carry more current while tube 4 carries less, and produce an unbalanced excitation of the fields F1 and F2 in a direction such that the motor FM tends to drive the rotor of the synchro-tie transformer in a direction and at an angular velocity to reduce the voltage error developed therein. Thus, the system always operates to reduce the voltage applied to the amplifier to zero, at which point the control fields are balanced and the output of the regulating generator is maintained due to its self energizing properties. Since the regulating generator RG is inherently an amplifier of the amplifier output, the voltage error may be very small. If the error signal voltage is of instantaneous opposite polarity with respect to the power supply, then the anode currents at tubes 3 and 4 are reversed. That is, tube 3 would now carry less current while tube 4 carries more. The amplifier in addition to being polarity sensitive also functions as a rectifier to provide the necessary unidirectional currents for energizing the control fields F1 and F2. Variations in the ratio of the speeds of the table and the saddle are obtained by changing the setting of the variable transmission VT2. For example, if it is desired to reduce the rate of movement of the saddle with respect to the table, adjustments of transmission VT2 are made to cause a drop in its output speed. This drops the speed of the synchro-tie generator SG and as a consequence through the control afforded by the amplifier and regulating generator RG provides a corresponding lower speed of the saddle and the synchro-tie transformer.

Stabilizing or anti-hunt voltages are fed back from the armature circuit of the motor and generator to the primary of the transformer 7. This transformer has two secondary windings each of which are connected in one leg of the amplifier channel in the control grid circuit for the tubes 3 and 4. The secondary windings are identical and reversed and thus introduce opposite anti-hunting control effects into the system, thereby minimizing tendencies of the system to overshoot conditions of equilibrium.

While alternating-current synchro-tie excitation is utilized, it will be apparent that direct-current synchro-tie systems may be utilized together with a polarity, sensitive direct-current amplifier. Such an arrangement is deemed within the scope of this invention's teachings of a synchro-tie system for producing an error position quantity and a normally balanced amplifier unbalanced in direction and magnitude depending upon the polarity and magnitude of the error position quantity, for controlling or synchronizing the movements of machine tool elements.

The foregoing disclosure and the showing made in the drawing are merely illustrative of the principles of this invention and are not to be interpreted in a limiting sense. The only limitations are to be determined from the scope of the appended claims.

I claim as my invention:

1. A control system for driving the cutting tool of a machine tool depending upon movements of the workpiece comprising, in combination, a synchro-tie generator driven at a speed proportional to the speed of the workpiece, a synchro-tie transformer driven at a speed proportional to the speed of the cutting tool, means for supplying alternating current to said synchro-tie generator, electrical means for driving said cutting tool, a regulating generator forming a part of said electrical means, said regulating generator having the resistance of its load circuit so adjusted that the resistance line thereof is tangent to the initial straight line portion of the no-load saturation curve of the generator, so that the generator is self-energizing and may have an electrical output represented by any of the points of tangency of the said resistance line and the no-load saturation curve, independent of external excitation; a field system for exciting the said regulating generator and controlling the electrical output thereof, an electronic amplifier including a pair of tubes connected in push-pull relationship, means for supplying alternating current for energizing said amplifier, said alternating current energizing said amplifier having a frequency the same as that supplied to said synchro-tie generator, a normally balanced plate circuit for the tubes of said amplifier, circuit means connecting said plate circuit to said field system to control said regulating generator, and means for controlling said tubes depending upon the electrical output of said synchro-tie transformer.

2. A control system for driving the cutting tool of a machine tool depending upon movements of the workpiece comprising, in combination, a synchro-tie generator driven at a speed proportional to the speed of the workpiece, a synchro-tie transformer driven at a speed proportional to the speed of the cutting tool, means for supplying alternating current to said synchro-tie generator, electrical means for driving said cutting tool, a regulating generator forming a part of said electrical means, said regulating generator having the resistance of its load circuit so adjusted that the resistance line thereof is tangent to the initial straight line portion of the no-load saturation curve of the generator, so that the generator is self-energizing and may have an electrical output represented by any of the points of tangency of the said resistance line and the no-load saturation curve, independent of external excitation; a field system for exciting the said regulating generator and controlling the electrical output thereof, an electronic amplifier including a pair of tubes connected in push-pull relationship, means for supplying alternating current for energizing said amplifier, said alternating current energizing said amplifier having a frequency the same as that supplied to said synchro-tie generator, a normally balanced plate circuit for the tubes of said amplifier, circuit means connecting said plate circuit to said field system to control said regulating generator, means for controlling said tubes depending upon the electrical output of said synchro-tie transformer, and means for varying the speed of operation of said synchro-tie generator with respect to the speed of said workpiece.

3. In a control system for a machine tool having a pair of relatively movable elements one element being a workpiece holder and the other element being a cutting tool holder, the combination of, a synchro-tie generator driven at a speed proportional to the speed of one of said elements, a synchro-tie transformer driven at a speed proportional to the speed of the other of said elements, circuit means connecting the synchro-tie generator and transformer to effect energization of the transformer by the generator, means for supplying electrical energy to the synchro-tie generator, electrical means for driving one of said elements, a regulating generator forming a part of said electrical means, said regulating generator having the resistance of its load circuit so adjusted that the resistance line thereof is tangent to the initial straight line portion of the no-load saturation curve of the generator, so that the generator is self-energizing and may have an electrical output represented by any of the points of tangency of the said resistance line and the no-load saturation curve, independent of external excitation; a field system for exciting the said regulating generator and controlling the electrical output thereof, an electronic amplifier having a pair of normally balanced electrical paths therethrough, means for energizing said amplifier, circuit means connecting said amplifier with said field system such that the electrical output of said amplifier controls the regulating generator, control means for regulating the currents in said electrical paths, and circuit means connecting said control means to be energized according to the electrical output of said synchro-tie transformer.

4. In a machine tool control system for a machine tool having a pair of relatively movable elements, one element being a workpiece holder and the other element being a cutting tool holder, the combination of, a synchro-tie generator driven at a speed proportional to the speed of one of said elements, a synchro-tie transformer driven at a speed proportional to the speed of the other of said elements, circuit means connecting the synchro-tie generator and transformer to effect energization of the transformer by the generator, means for supplying electrical energy to the synchro-tie generator, a motor for driving the cutting tool holder and having an armature winding and a field winding, means for energizing the field winding, a regulating generator for energizing the armature winding of said motor, said regulating generator having the resistance line of the load circuit thereof adjusted so that the resistance line thereof is tangent to the initial straight line portion of the no-load saturation curve of the generator, so that the generator is self-energizing and may have an electrical output represented by any of the points of tangency of the said resistance line and the said no-load saturation curve, independent of external excitation; a field system for exciting said regulating generator, and controlling the electrical output thereof, an electronic amplifier having a pair of normally balanced electrical paths therethrough, means for energizing said amplifier, circuit means connecting said amplifier with said field system such that the electrical output of said amplifier controls said field system, control means for regulating the currents in said electrical paths, circuit means connecting said control means to be energized according to the electrical output of said synchro-tie transformer, and means for changing the speed of operation of one of the synchro-tie elements independently of the speed of its associated machine tool element.

5. In a machine tool control system for a machine tool having a pair of relatively movable elements, one element being a workpiece holder and the other element being a cutting tool holder, the combination of, a synchro-tie generator driven at a speed proportional to the workpiece holder, a synchro-tie transformer driven at a speed proportional to the cutting tool holder, circuit means connecting the synchro-tie generator and transformer to effect energization of the synchro-tie transformer by the synchro-tie generator, means for supplying electrical energy to the synchro-tie generator, a motor for driving the cutting tool holder and having an armature winding and a field winding, means for supplying electrical excitation to the field winding, a regulating generator for energizing the armature winding of said motor, said regulating generator having the resistance of the load circuit thereof adjusted so that the resistance line thereof is tangent to the initial straight line portion of the no-load saturation curve of the regulating generator, so that the regulating generator is self-energizing and may have an electrical output represented by any of the points of tangency of the said resistance line and the said no-load saturation curve, independent of external excitation; a pair of differentially related field windings for exciting the regulating generator, an electronic amplifier having a pair of normally balanced electrical paths therethrough, means for supplying electrical energy to said amplifier, circuit means connecting said differentially related field windings to said electrical paths of said amplifier to be energized in dependence on the electrical quantities thereof, control means for regulating the electrical currents in said electrical paths of said amplifier, circuit means connecting said control means to said synchro-tie transformer to be energized according to the electrical output of said synchro-tie transformer, and means for changing the speed of operation of said synchro-tie generator independently of the speed of operation of said workpiece holder.

LOUIS W. HERCHENROEDER.

REFERENCES CITED

The following references are of record in the file of this patent:

UNITED STATES PATENTS

| Number | Name | Date |
| --- | --- | --- |
| 1,547,392 | Hewlett et al. | July 28, 1925 |
| 1,871,499 | Crago | Aug. 16, 1932 |
| 2,140,565 | Svenson | Dec. 20, 1938 |
| 2,340,060 | King et al. | Jan. 25, 1944 |
| 2,389,368 | King | Nov. 20, 1945 |